United States Patent [19]

Galbraith

[11] Patent Number: 4,664,252
[45] Date of Patent: May 12, 1987

[54] HUB ASSEMBLY
[75] Inventor: Ross E. Galbraith, Edinburgh, Scotland
[73] Assignee: Burroughs Corporation, Detroit, Mich.
[21] Appl. No.: 806,501
[22] Filed: Dec. 9, 1985
[30] Foreign Application Priority Data Dec. 22, 1984 [GB] United Kingdom ................. 8432607

[51] Int. Cl.⁴ .............................................. B65G 35/00
[52] U.S. Cl. ..................................... 198/722; 198/780; 193/37; 271/31.1; 301/121; 301/122; 403/348
[58] Field of Search .................... 198/622–624, 198/722, 780; 193/35 R, 37; 271/31.1; 301/1, 5.3, 5.7, 112, 118, 121, 122; 403/348, 349; 16/18 R, 30, 38, 45

[56] References Cited
U.S. PATENT DOCUMENTS 1,130,726  3/1915  Greve .................................. 403/348
1,199,690  9/1916  Gillan ................................. 403/348
3,068,918  12/1962 Smith .................................. 198/624
3,360,260  12/1967 Rapparlie et al. .................. 198/623
3,526,312  9/1970  Braas .................................. 198/624
4,043,685  8/1977  Hyams ............................... 301/121
4,477,121  9/1982  Atkins ................................ 301/122

Primary Examiner—Joseph E. Valenza
Attorney, Agent, or Firm—Mark T. Starr

[57] ABSTRACT

A scrub wheel is provided in document processing equipment where a wheel is removable and replaceable. The wheel is held between a base member and a top member where the top member comprises retaining lugs at the distal ends of retention arms which engage the lower surface of a ledge in the center of the base member subsequent to passage therethrough when in a correct angular orientation, the lower surface comprising recesses which bind the top member and the base member under the elastic restitution force of a helical spring in the top member.

20 Claims, 24 Drawing Figures

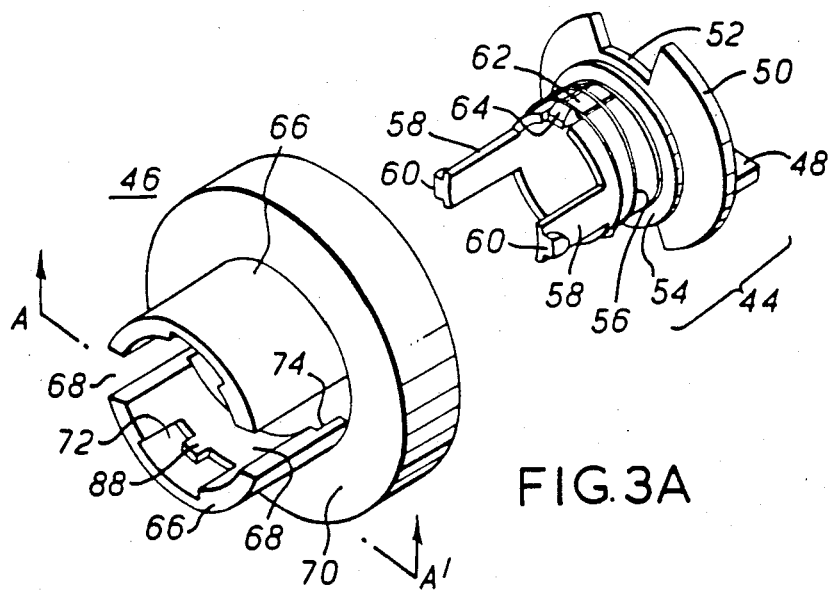
FIG.3A
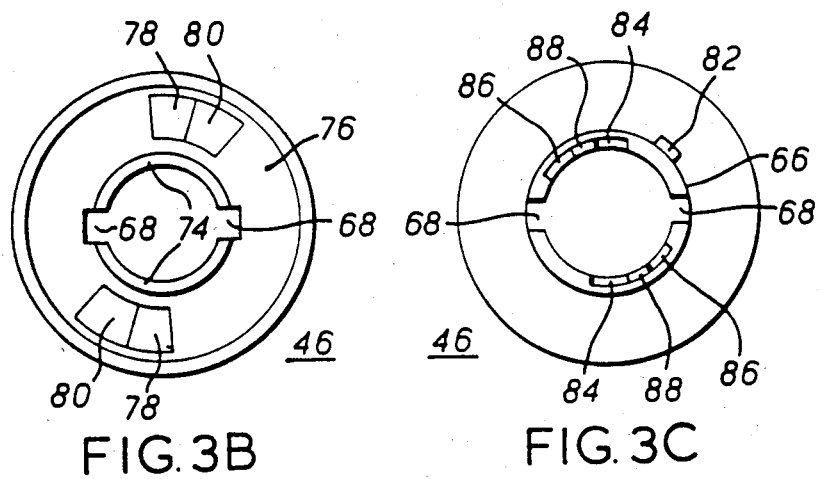
FIG.3B
FIG.3C

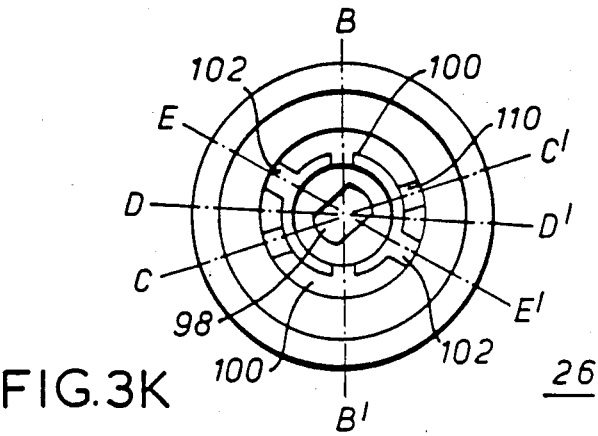
FIG.3K
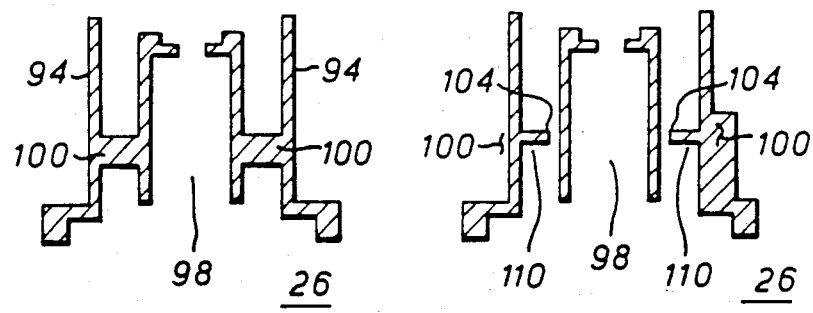
FIG.3L  FIG.3M
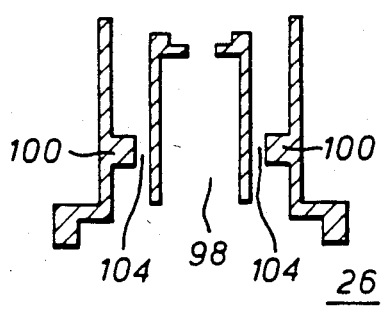 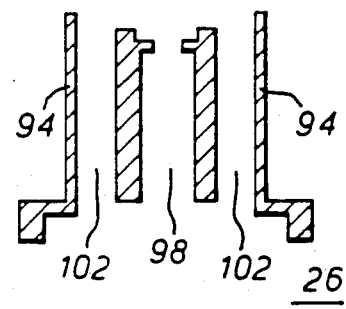
FIG.3N  FIG.3P

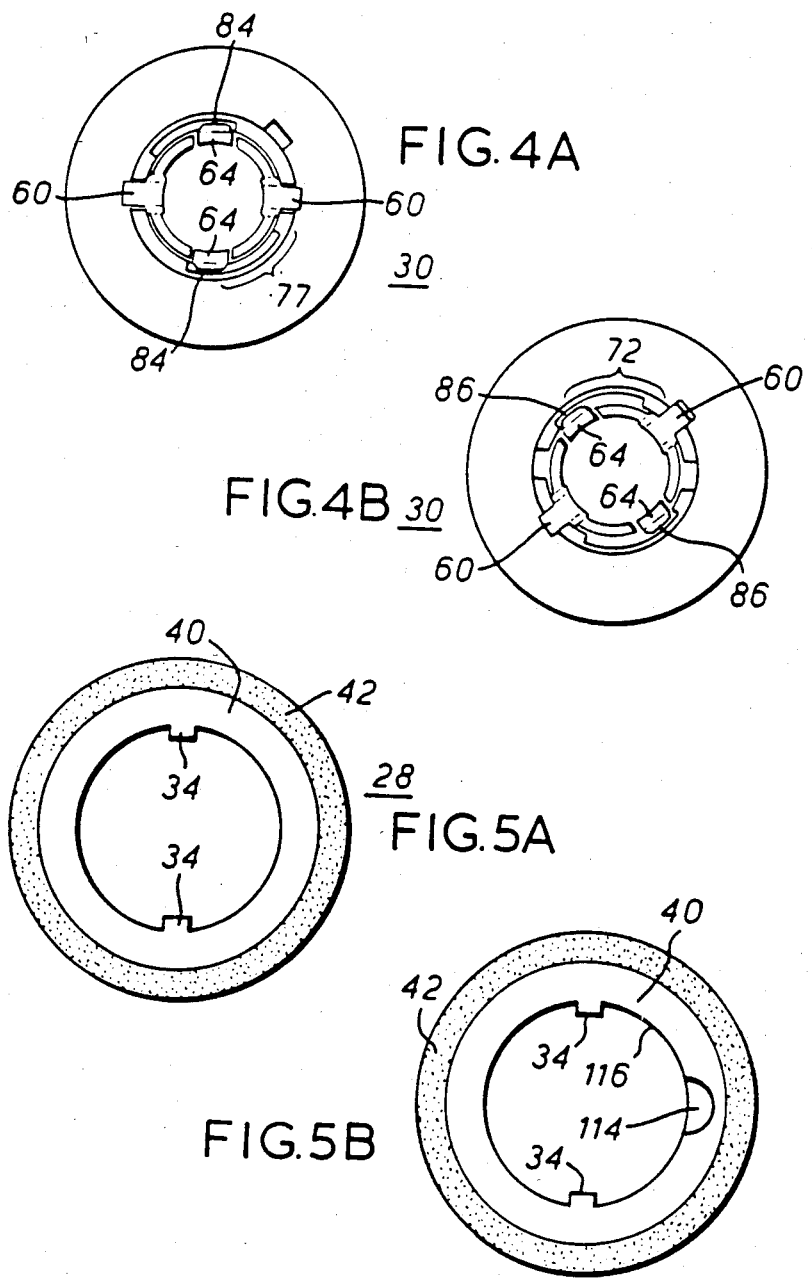

HUB ASSEMBLY

BACKGROUND OF THE INVENTION

The present invention relates to a hub assembly for holding a replacable wheel where the hub assembly may be manually disassembled to release a previously-held wheel and reassembled to hold and to rotate a fresh wheel. The present invention more closely relates to such an assembly of demountable hub and wheel where wheel replacement is achieved with minimal manual intervention.

While the present invention is hereinafter described in relation to a hub and wheel assembly for use in a document moving track in a document encoder, it is not intended that this illustrated use should represent a limitation upon the application of the present invention which may be used in any situation where a wheel must periodically be replaced or removed, such as in office equipment, mechanical gear boxes, and for vehicular wheels. The present invention may be employed securely to hold any object which requires to be rotated about the axis or shaft.

In document encoding machinery such as is used for automated processing of check in banking, it is usual to employ a document track into which checks are fed one by one from a stack for automated processing as the checks pass along the length of the track. In order to avoid the inadvertent movement along the track of two or more checks together, it is the practice to provide in the track a pair of opposed rubber wheels one of which rotates with a small angular velocity and the other of which rotates with a high angular velocity. When a check passes therebetween, if there is only one check present it is gripped by the wheel of low angular velocity and the wheel of high angular velocity rubs at high speed against the other face of the check. If two or more checks come along the document track together, the wheel of high angular velocity engages the additional check or checks and projects them at higher speed along the document track to avoid the checks passing together along the track. Thus, the wheel of high angular velocity scrubs continuously against either the wheel of low angular velocity or the rear of a document to be processed. Only on very rare occasions when two documents come along the document track together is the wheel of high angular velocity free from scrubbing against objects moving much more slowly than itself and therefore free from the high attritional wear attendant thereon. The wheel of high angular velocity is therefore subject to frequent replacement as its dimensions and consequent elastic pressure in opposition to the wheel of low angular velocity are reduced by frictional attrition.

In the past, it has been the practice to provide as the scrub wheel of high angular velocity a wheel and hub assembly wherein a replacable wheel having an elastic tire fitted thereon is held on the hub, the hub consisting in a base member and a holding member. The holding member was attached to the base member to clamp the wheel between the holding member and the base member by means of displacable elastic arms having a clip at the distal end of each for engaging the base member. In order to remove the holding member it was necessary to use some kind of tool and two hands. The elastic arms of the holding member were liable to fatigue fracture making the life expectancy of the holding member very short in terms of the number of times that a wheel could be changed. The replacement of the wheel required to be undertaken by skilled personnel whose presence and time was costly. The amount of time during which a machine was out of use while its wheel or wheels were being changed was high.

Other mechanical arrangements for holding a wheel were envisaged. Each arrangement required the provision of complex machined parts, costly in themselves to produce.

It is, therefore, desirable to provide a wheel and hub assembly where replacement of the wheel is rapidly and readily achieved by unskilled personnel without the use of tools and without stress to the hub assembly so that the hub assembly may indefinitely be used to hold replacement wheels without risk of stress fractures. Further, it is desirable that the wheel and hub assembly be of a simple construction capable of being made in a low cost fabrication process such as moulding.

SUMMARY OF THE INVENTION

The present invention consists in an assembly comprising a wheel and a demountable hub, said wheel being removably mountable upon said hub to receive rotational drive therefrom; said hub comprising a base member where said base member is mountable upon a driven shaft to receive said rotational drive therefrom, where said base member comprises a mounting surface for receiving said wheel for said wheel to be rotated co-axially with the shaft, and where said mounting surface comprises coupling means for coupling said rotational drive from said base member to said wheel; and said hub further comprising a top member, where said top member comprises a bearing member for engaging said wheel to trap said wheel between said bearing member and said base member, and a clamping member for reversibly engaging said base member to urge said bearing member towards said base member, said top member being removable from said base member when said clamping member is not in engagement with said base member to allow removal of said wheel, said clamping member comprising a handle for manual depression and rotation of said clamping member relative to said bearing member: said clamping member comprising a first catch and said bearing member comprising a first catch receiver for mutual engagement therebetween to retain said clamping member in association with said bearing member when said clamping member is not in engagement with said base member in a first or a second primary retention position having a first angular spacing therebetween, passage between said first and second primary retention positions being achieved by depression, rotation and release under elastic restitution of said clamping member relatively to said bearing member; and said clamping member further comprising a second catch for insertion into said base member if and only if said clamping member is in said first primary retention position and if said top member is in a predetermined angular relationship to said base member, said base member comprising a second catch receiver operable to receive said second catch to urge said top member towards said base member subsequently to said insertion of said second catch into said base member, in response to said passage of said clamping member between said first and said second primary retention positions, and in consequence of said elastic restitution.

In a preferred embodiment of the present invention a wheel and hub assembly is provided preferably as the scrub wheel of high rotational speed in a document track for separating double documents which may inadvertently pass along the track.

In the preferred embodiment there is provided a cylindrical base member co-axially mounted to rotate upon a driven shaft. The base member comprises a cylindrical mounting surface for accepting a cylindrical inner surface of a wheel rim whereon an elastic tire is held. The mounting surface comprises a keyway for accepting a key on the inner surface of the wheel rim, thereby to impart rotational torque from the shaft to the wheel rim and thus to the elastic tire.

The preferred embodiment also comprises a top member which mounts upon the base member to clamp the wheel therebetween. The base member comprises a base rim whereon the wheel can rest. The top member comprises a top rim which, when the top member is co-axially assembled upon the base member, traps the wheel between itself and the base wheel. The top member in its turn comprises a bearing member whereon the top rim is affixed and a clamping member for holding and urging the top member towards the base member. The bearing member preferably is affixed co-axially within the base member and the clamping member preferably is situated co-axially within the bearing member. The clamping member comprises a first catch and a first catch receiver for holding the clamping member within the bearing member against opposition by a helical spring. The first catch preferably comprises an elastic arm with a clip at its distal end which, as the clamping member is inserted into the bearing member, engages a cutaway portion inside the bearing member which affords a first and a second angularly displaced primary retention position. The clamping member also comprises a second catch in the form of a retention arm which extends axially towards the base member and comprises a retaining lug proximate to its distal end. The base member comprises a perforate ledge wherethrough the retention arm and its lug can pass if and only if the top member and the base member are in a predetermined angular relationship one to the other and if the clamping member is in the first primary retentioned position. The requisite orientation between the top member and the base member before the retention arm may pass through the ledge in the base member is further assisted by a projection on the outer surface of the bearing member to be co-axially inserted into the base member and a gap in the upper edge of the bearing surface of the base member operative such that the projection enters the gap to allow entry of the bearing member with its retention arm into the base member if and only if the base member and the top member are in the required predetermined angular relationship one to the other.

Having thus passed the retention arm and the lug at its distal end through the ledge in the base member the clamping member is depressed and rotated to cause the lug to pass beneath the ledge on its lower surface in the base member and engage a recess wherein, upon release of the clamping member, the lug is urged by the elastic restitution afforded by the helical spring between the clamping member and the bearing member to hold the top member firmly in association with the base member and urge the base member and the top member together to hold the wheel therebetween.

The lug engages the recess when the clamping member is positioned relative to the bearing member in the second of the two primary retention positions. The axial length of the retention arm is chosen such that, with the lug in the recess, the first catch does not fully engage the axially uppermost edge of the cutaway portion within the inside wall of the bearing member for the full force of the helical spring between the clamping meber and the bearing member to urge the bearing member and the base member together.

DESCRIPTION OF THE DRAWINGS

The present invention is further described by way of an example by the following description taken in conjunction with the appended drawings in which:

FIG. 3A shows an exploded view of the clamping member and the bearing member together making up the top member shown in FIG. 2.

FIG. 3B shows a plan view from above of the bearing member shown in FIG. 3A.

FIG. 3C shows a plan view from below of the bearing member shown in FIG. 3A.

FIG. 3K shows a view from below of the base member of FIG. 2.

FIG. 3L shows a cross-sectional view of the base member taken along the line B—B' shown in FIG. 3K.

FIG. 3M shows a cross-sectional view of the base member taken along the line C—C' of FIG. 3K.

FIG. 3N shows a cross-sectional view of the base member taken along the line D—D' of FIG. 3K.

FIG. 3P shows a cross-sectional view of the base member taken along the line E—E' of FIG. 3K.

FIG. 4A shows a plan view from below of the assembled top member of FIG. 2 with the clamping member in the first primary retention position.

FIG. 4B shows the assembled top member of FIG. 4A with the clamping member in the second primary retention position.

FIG. 5A shows a plan view from above of the wheel assembly of FIG. 2.

FIG. 5B shows a plan view from below the wheel assembly of FIG. 2.

DETAILED DESCRIPTION OF THE PREFERRED EMBODIMENT

Figure 1:
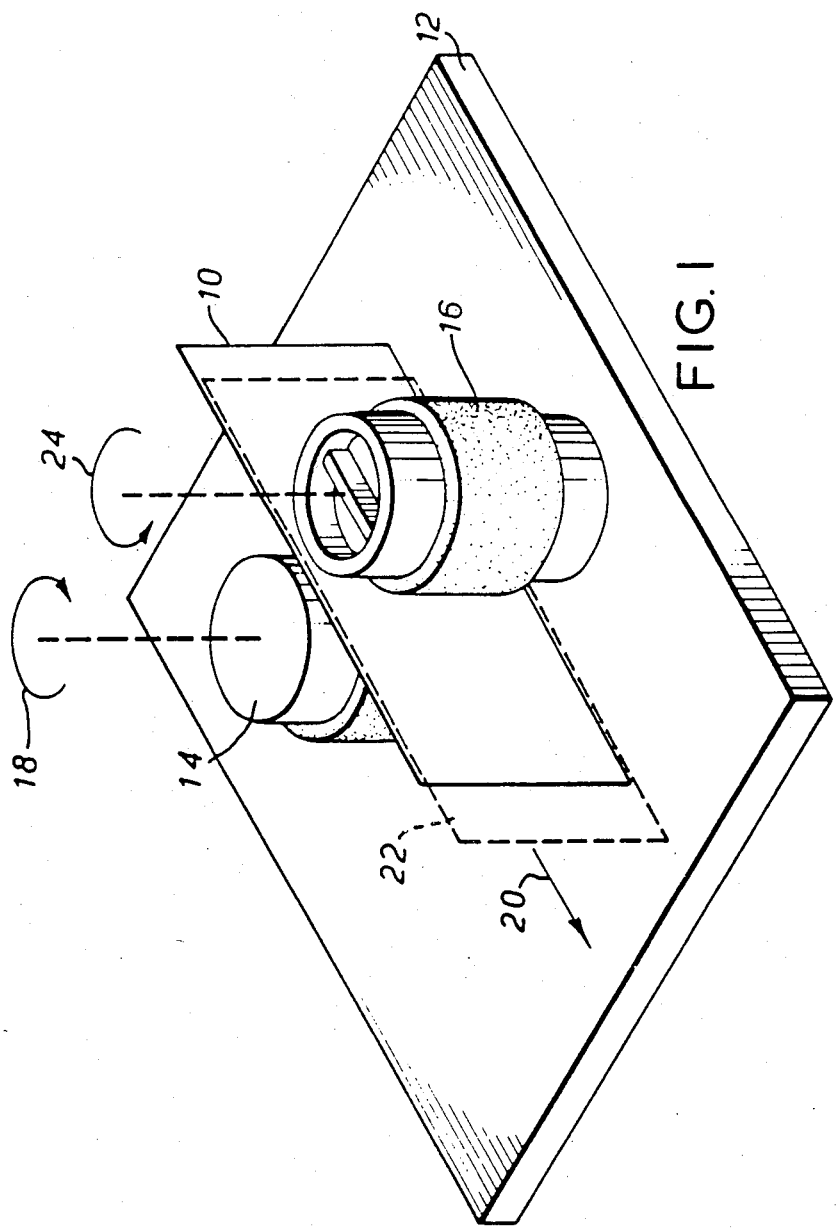
FIG. 1 shows a schematic projected view of the the preferred embodiment of the present invention in the form of a high rotational speed scrub wheel in a document track.

FIG. 1 shows the preferred embodiment in the present invention installed as part of a document track in a document encoding machine. A first sheet of paper 10 moves along a document track on a base 12 between a drive wheel 14 and a scrub wheel 16. The drive wheel 14 rotates as indicated by a first arrow 18 with a small angular velocity to urge the first sheet of paper 10 in the direction of a second arrow 20. The scrub wheel 16 rotates with a high angular velocity. When only the first sheet of paper 10 is present between the two wheels 14, 16 the co-efficients of friction of the drive wheel 14 and the scrub wheel 16 are so chosen that the first sheet of paper 10 is more strongly held by the drive wheel 14 and progresses slowly along the document track. In this circumstance, the scrub wheel 16 rubs against the back of the first sheet of paper 10. If however a second sheet of paper 22 (shown in broken outline) is present along with the first sheet of paper 10 the scrub wheel 16 engages the second sheet of paper 22 and causes it to slide against the first sheet of paper 10 with a high velocity in consequence of the rotation of the scrub wheel 16 as indicated by the third arrow 24. The second sheet of paper 22 thus is moved rapidly down the track to be separated from the first sheet of paper 10. The second sheet of paper may be either be processed along the track or may be discarded for later reloading.

Figure 2:
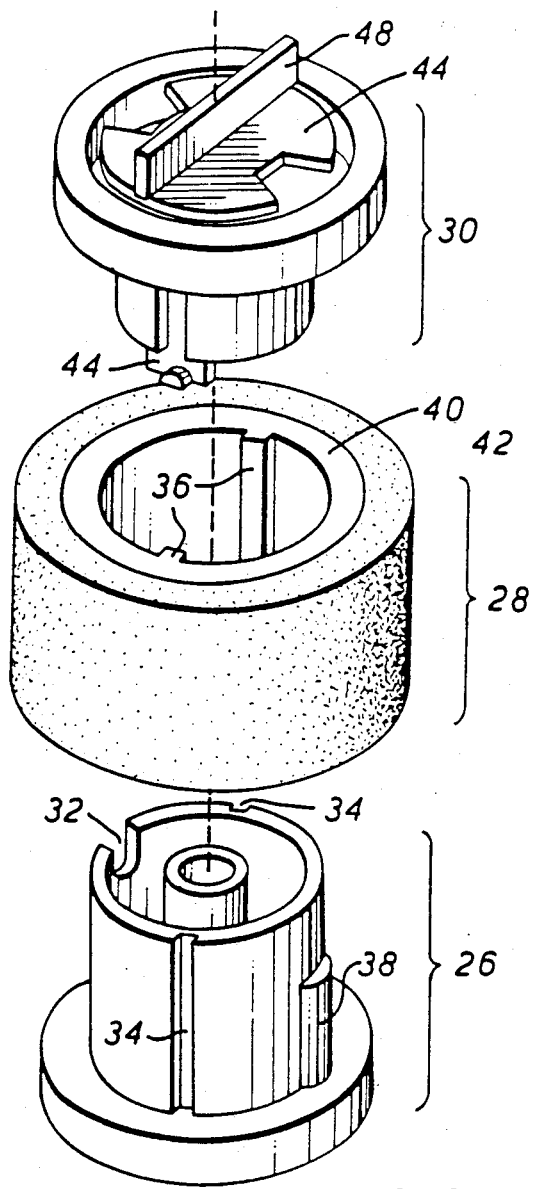
FIG. 2 shows an exploded projected view of the base member, the wheel and the top member of the preferred embodiment.

FIG. 2 shows an exploded view of the scrub wheel assembly 16 of FIG. 1. The scrub wheel assembly 16 comprises a base member 26, a wheel 28 and a top member 30. The base member comprises a gap 32 for engaging a projection on the top member 30 not shown in FIG. 2. The base member further comprises a pair of keyways 34 for engaging a corresponding pair of keys 36 in the wheel 28. The base member yet further comprises an insert 38 for engaging a corresponding void in the wheel 28 not shown in FIG. 2 and designed to prevent the wheel 28 from being inserted over the base member 26 upside down.

The wheel 28 comprises a wheel rim 40 supporting an elastic tire 42 which may be made of natural or synthetic rubber having the desired coefficient friction against the paper to give the above-described properties in separating two sheets of paper 10,22.

The top member 30 comprises a clamping member 44 held within a bearing member 46. The clamping member 44 comprises a handle 48 whereby the clamping member 44 may be depressed and rotated relative to the bearing member 46 and the base member 26.

FIG. 3A shows an exploded view of the top member 30 shown in FIG. 2. The clamping member 44 comprises a top disc 50 immediately beneath the handle 48 having a pair of missing segments 52 whose purpose is later to be described. The clamping member 44 further comprises a spring supporting disc 54 for supporting one end of a helical spring 56. The clamping member 44 yet further comprises a diametrically-opposed pair of retention arms 58 at the distal end of each of which is provided a retaining lug 60 whose purpose is later to be described. The clamping member 44 further comprises a diametrically-opposed pair of resilient elastic arms 62 at the distal end of each of which is provided a clip 64.

The bearing member 46 comprises a barrel portion 66 having a pair of cutaway channels 68 allowing the ingress of the retaining lugs 60 of the clamping member 44 into the bearing member 46. The bearing member 46 further comprises a bearing face 70 for pushing against the top surface of the wheel 28 when the assembly of the present invention is in an assembled condition.

The bearing member 46 further comprises a first catch receiver in the form of a cutaway portion 72 formed by partway cutting through the barrel portion 66 of the bearing member from the inside. As will later be explained, the first part of a first catch provided in the form of the clip 64 engages the second part of the second catch provided in the form of the cutaway portion 72 to provide first and second primary retention positions angularly spaced for the clamping member 44 relative to the bearing member 46.

FIG. 3B shows a top view of the bearing member 46 of FIG. 3A. The FIG. 3B more clearly shows how the channels 68 for the admission of the retaining lugs are cut into the material of the bearing member 46. The inner surface of the barrel portion 66 of the bearing member 46 comprises a spring retaining ledge 74 for engaging the other end of the helical spring 56 shown in FIG. 3A. Printed on the top surface 76 of the bearing member 46 are a first pair of colored areas 78 and a second pair of colored areas 80. The first pair of colored areas 78 are visible through the missing segments 52 of the top disc 50 of the clamping member 44 when the clamping member 44 is in the first primary retention position. The second pair of colored areas 80 are visible through the missing segments 52 when the clamping member 44 is in the second primary retention position.

FIG. 3C shows a plan view from the bottom of the bearing member 46 otherwise shown in FIG. 2 and in FIG. 3A. The barrel portion 66 of the bearing member 46 comprises the projection 82 for engaging the gap 32 otherwise shown in FIG. 2 to arrange that the top member 30 is in the correct angular orientation with respect to the base member 26 before the top member 30 can be inserted fully into the base member 26. The cutaway portion 72 comprises a first gap 84 angularly spaced from a second gap 86 having an intervening extension 88 which, as shown in FIG. 3A, extends only partway down the cutaway portion 72.

Figure 3D:
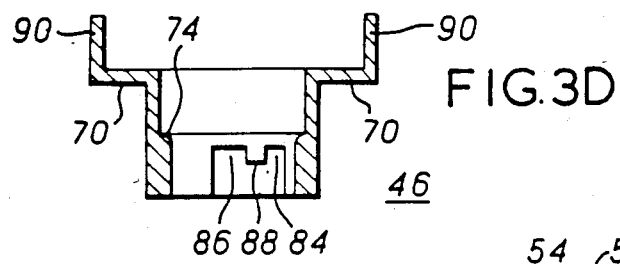
FIG. 3D shows a cross-sectional view taken along the line A—A' of FIG. 3A of the bearing member and showing details of the cutaway indended section of the first catch.

FIG. 3D shows a plan view of the bearing member 46 when bisected by the line A—A' as indicated in FIG. 3A and looking in the direction of the arrows. Clearly shown in FIG. 3D are a collar 90 of such a height that the handle 48 of the clamping member 44 is fully contained within the collar 90 when the assembly of the preferred embodiment is completed.

Figure 3E:
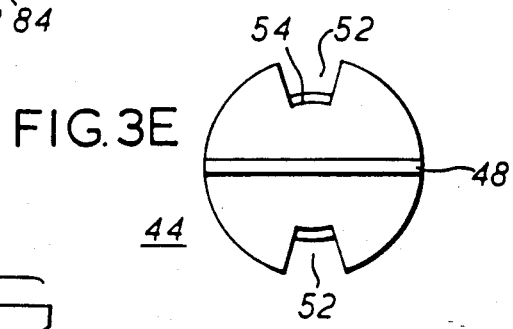
FIG. 3E shows a plan view from the top of the clamping member of FIG. 3A.

FIG. 3E shows a top view of the clamping member 44 of FIG. 3A showing in greater detail the spring supporting disc 54, the missing segments 52 and the handle 48.

Figure 3I:
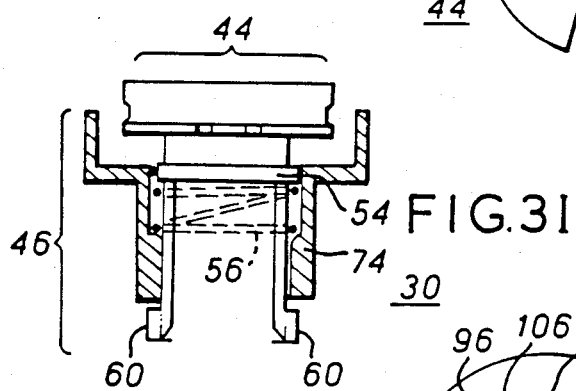
FIG. 3I shows a cross-sectional view taken through a diameter consistent with the side elevation of FIG. 3G of the clamping member installed in the bearing member.
Figure 3J:
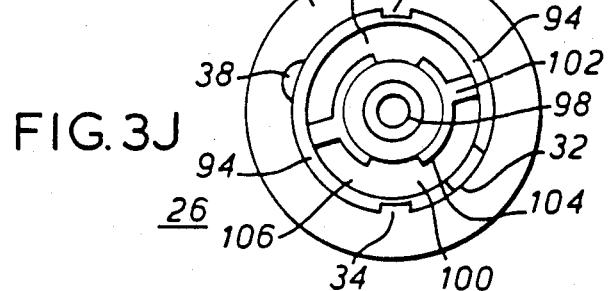
FIG. 3J shows the view from above of the base member of FIG. 2.
Figure 3F:
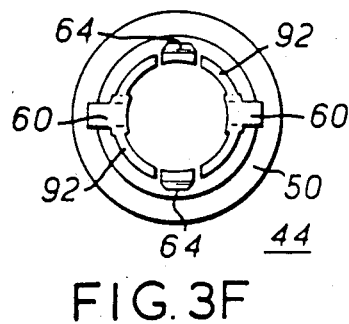
FIG. 3F shows a plan view from below of the clamping member of FIG. 3F.

FIG. 3F shows a bottom view of the clamping member 44 shown in FIG. 2 and FIG. 3A. FIG. 3F clearly shows the retaining lugs 60 extending down from cylindrical wall portions 92 (hereinafter referred to as third cylindrical wall portions) from which the retention arm 58 depends. FIG. 3F further shows how the resilient elastic arms 62 are formed by the provision of cuts 94 through the material of the cylindrical walls.

Figure 3G:
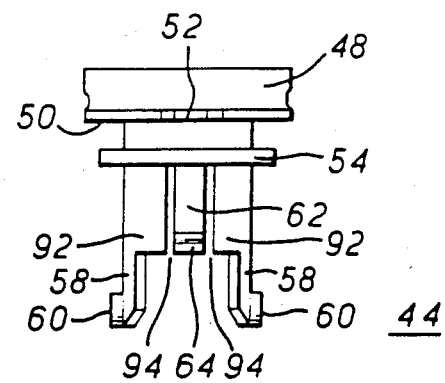
FIG. 3G shows a first side elevation of the clamping member of FIG. 3A.
Figure 3H:
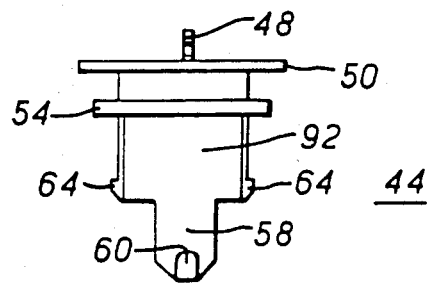
FIG. 3H shows a second side elevation of the clamping member otherwise shown in FIGS. 3A and 3G, the side elevation of FIG. 3H being from a viewpoint circumferentially 90° around from that shown in FIG. 3G.

FIGS. 3G and 3H show further aspects of FIG. 3F in the form of first and second elevations of the clamping member 44 viewed from two points circumferentially 90° apart.

FIG. 3I shows a cross-sectional view of the assembled top member 30 of FIG. 2 illustrating how the spring supporting disc 54 and the spring supporting wedge 74 cooperate to trap the helical spring 56 therebetween such that the helical spring 56 tends to urge the clamping member 44 out of the bearing member 46 wherein the clamping member 44 fits concentrically.

FIG. 3J shows a plan view from above of the base member shown in FIG. 2. The base member 26 comprises cylindrical walls 94 (hereinafter referred to as third cylindrical walls) wherein the keyways 34 and the gap 32 are set as previously described. The outer surface of the cylindrical walls 94 form a mounting surface for the wheel rim 40 of FIG. 2. The insert 38 extends to a lower bearing surface 96 from midway up the cylindrical walls 94 of the base member 26.

The base member comprises therein a central shaftway 98 for accepting a driven shaft to rotate the base member 26. Between the central shaftway and the cylindrical walls 94 of the base member 26 there is provided a ledge 100 having channels 102 for the passage therethrough of the retaining lugs 60 and slots 104 allowing the retention arms 56 a degree of rotation within the ledge 100 after the retaining lugs 60 have been inserted through the channels 102. FIG. 3J shows an upper surface 106 of the ledge 100.

FIG. 3K shows a projected view from below of the base member 26 of FIG. 2. FIG. 3K shows a lower surface 108 of the ledge 100 wherein are set a pair of diametrically-opposed radial recesses 110 separated from the channels 102 by an angle equal to the separation between the first and second primary retention positions of the clamping member 44 in the bearing member 46. The central shaftway 98 at its lower end is shown flatted, the better to engage flats on the driven shaft to accept rotational torque therefrom.

FIG. 3L shows a cross-sectional view of the base member 26 viewed along the line B—B′ of FIG. 3K illustrating how the ledge 100 at that point is of a first thickness extending all the way between the central shaftway 98 and the cylindrical walls 94 of the base member 26 thus supporting the cylindrical walls 94 of the base member 26 on the shaftway 98.

FIG. 3M shows a cross-section of the base member 26 taken along the line C—C′ shown in FIG. 3K. FIG. 3M illustrates how the recesses 110 pass only partway axially through the ledge 100 and are separated from the central shaftway 98 by the slots 104.

FIG. 3N shows a cross-section of the base member 26 taken along the line D—D′ of FIG. 3K and illustrates how the ledge 100 in the vicinity of the slots 104 is separated from the central shaftway 98.

FIG. 3P shows a cross-section of the base member 26 taken along the line E—E′ of FIG. 3K illustrating how in the region of the channels 102 of the cylidnrical walls 94 of the base member 26 are completely clear of the central shaftway 98 by virtue of the ledge 100 (not shown in FIG. 3P) being completed absent.

FIG. 4A shows a plan view from the bottom of the assembled top member 30 of FIG. 2 when the clamping member 44 is in the first primary retention position. In this position the clip 64 engages the first gap 84 in the cutaway portion 72. As the top member 30 is assembled by insertion of the clamping member 44 inside the barrel portion 66 of the bearing member 46, so the clip 64 is displaced at the tip of the elastic resilient arms 62 until it meets the first gap 84 in the cutaway portion 72 wherein it is forced to enter by virture of the retaining lugs 60 running in the channels 68 in the bearing member 46.

FIG. 4B shows a similar view to that of FIG. 4A with the exception that the top member 44 is in the second primary retention position with respect to the bearing member 46. In this position the clip 64 rests in the second gap 86 of the cutaway portion 72. The clamping member 48 is moved from one position to the other by depression of the handle 48 against the elastic restitutional force of the helical spring 56 until the tip of the clip 64 clears the extension 88 at which point the handle 48 may be released to allow the clip 64 to fall into the selected gap 84,86. In moving from the first to the second gap 84,86 so the retaining lugs 60 are rotated.

FIG. 5A shows a view from the top of the wheel 28 otherwise shown in FIG. 2 illustrating keys 34 on the inner surface of the wheel rim 40 supportive of the elastic resilient tyre 42. FIG. 5B on the other hand shows a view from the bottom of the wheel 28 otherwise shown in FIG. 2 showing how keys 34 pass all the way down the inner surface of the wheel rim 40. FIG. 5B also shows a void 114 of complementary shape to the insert 38 and extending halfway up the inner wall 116 of the wheel rim 42. When assembling the wheel 28 onto the base member 26 the void 114 and the insert 38 co-operate to prevent the wheel 28 being placed on the base member 26 in anything other than the correct way up. In initial manufacture of high rotational speed scrub wheel assemblies 16 the tire 42 is buffed in a preferred direction and the wheel 28 is therefore preferred to rotate in its own preferred direction wherein its coefficient of friction is highest. Accordingly, it is desirable to mount the wheel 28 a correct way up and the void 114 and the insert 38 ensure that this must happen.

Figure 6A:
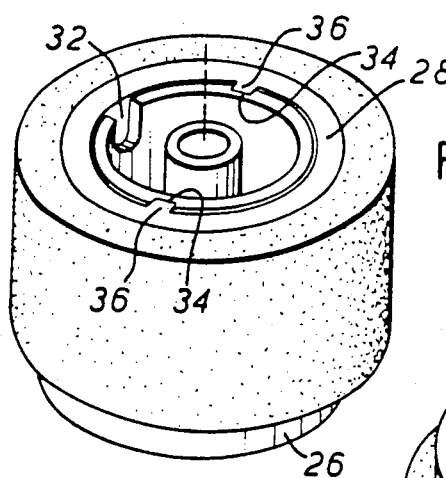
FIG. 6A shows the first stage in the assembly of the hub and wheel of the preferred embodiment.

FIG. 6A shows a first stage in the assembly of the preferred embodiment of the present invention. The wheel 28 is slid onto the base member 26 such that the keys 36 engage the keyways 34 and the void 114 engages the insert 38 for the wheel 28 to be slid all the way home onto the base member 26.

Figure 6C:
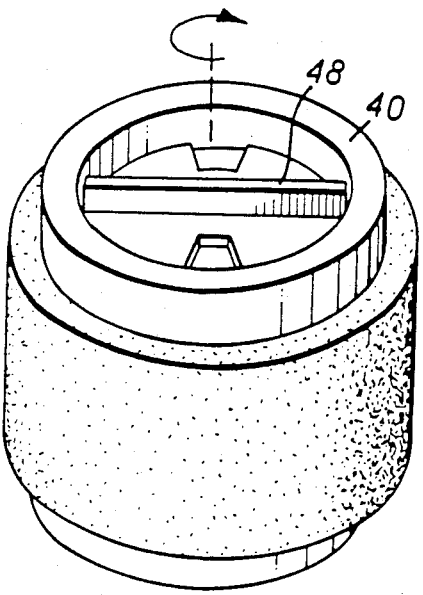
FIG. 6C shows the final stage in the assembly of the hub and wheel of the preferred embodiment of the present invention.
Figure 6B:
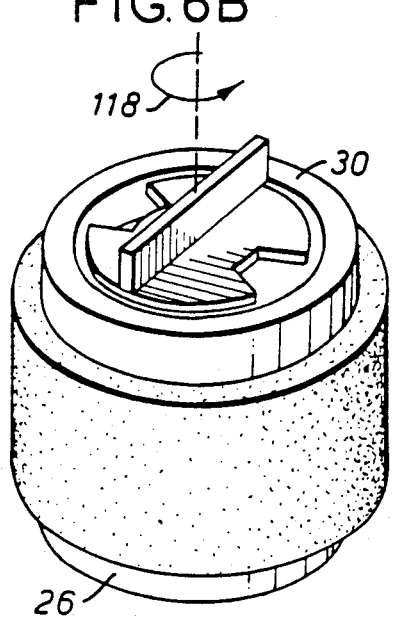
FIG. 6B shows the second stage in the assembly of the hub and wheel.

FIG. 6B shows the second stage of assembly of the preferred embodiment of the present invention. The top member 30 is assembled such that its barrel portion 66 slides within the cylindrical walls 94 of the base member 26. The tips of the retention arms 58 engage the upper surface 106 of the ledge 100 preventing further ingress of the top member 30 into the base member 26. Similarly, the projection 82 rests upon the upper surface of the cylindrical walls 94 of the base member 26. The top member 30 is rotataed as indicated by the arrow 118 until the retaining lugs 60 engage the channels 102 in the ledge 100 which event occurs simultaneously with the projection 82 entering the gap 32 thus allowing further ingress of the top member 30 into the base member 26. The gap 32 and the projection 82 co-operate to prevent relative rotation between the top member 30 and the base member 26.

The top member 30 cannot be inserted into the base member 26 unless the clamping member 44 is in the first primary retention position as illustrated in FIG. 4A. If the clamping member 44 is in the second primary retention position as illustrated in FIG. 4B the retaining lugs 60 will be in the wrong angular position to permit their insertion into the channels 102 in the ledge 100 in the base member 26 simultaneously with entry of the projection 82 into the gap 32. Should this be the case, the clamping member 44 must be returned to the first primary retention position as illustrated in FIG. 4A. Assembly of the preferred embodiment of the present invention is thus prevented if the top member 30 is wrongly position within itself.

FIG. 6C shows the final stage in assembly of the preferred embodiment of the present invention. The handle 48 is depressed into the bearing member 46 behind the collar 90 and rotated to bring the clamping member 44 into the second primary retention position illustrated in FIG. 4B simultaneously with bringing the retaining lugs 60 over the recesses 110. The handle 48 is then released allowing the retaining lugs 60 to fall back into the recesses 110. The depth of the second gaps 86 of the cutaway portion 72 is such that the retaining lugs 60 engage the recesses 110 before a clip 64 engages the second gap 86 of the cutaway portion 72 thus ensuring that the entire force of the helical spring 56 is applied between the clamping member 44 and the base member 26.

In the above-described manner the wheel 28 is clamped between the top member 30 and the base member 26 and may be unclamped by a simple reversal of the procedure, that is; depressing the handle 48, rotating the handle until the first primary retention position is reached, and thereafter releasing the handle 48 which allows the retaining lugs 60 to be removed through the channels 102 for the top member 30 to be removed from the base member 26 and the wheel 28 extracted.

While the present invention has been described in relation to a scrub wheel in a document track for document processing machinery, it is to be appreciated that the wheel 28 may be replaced by any other kind of wheel such as a gear wheel, a vehicular wheel, or indeed any piece of rotary machinery where it is desired to have a simple yet positive means of replacable attachment to a shaft. In the present invention the shaft may be rotated in either direction without prejudice to the operation of the invention. While the present invention has been shown using pairs of diametrically-opposed clips and catches, it is to be appreciated that almost any circumferential pattern of such catches, retaining lugs and the like may be used.

The shape of the retaining lugs 44 and of the recesses 110 may be so chosen that as torque is applied to the base member 26 the top member 30 may be more positively driven into the base member 26 rather than expelled therefrom. During assembly of the preferred embodiment of the present invention the channels 68 in the walls 66 of the bearing member 46 are, in the position illustrated in FIG. 6B where the retaining lugs 60 are about to pass through the channels 102 in the ledge 100, in radial circumferential and axial alignment with the channels 102 in the ledge 100.

When assembled, the cylindrical walls of the bearing member 44 are arranged to rest at their far ends upon the ledge 100 of the base member 26, though it is to be appreciated that, if it is desired directly to trap the wheel 28 between the base member 26 and the top member 30 under the action of the helical spring 56, this condition is not a necessary feature of the present invention.

I claim:

1. An assembly comprising a wheel and a demountable hub, said wheel being removably mountable upon said hub to receive rotational drive therefrom; said hub comprising a base member where said base member is mountable upon a driven shaft to receive said rotational drive therefrom, where said base member comprises a mounting surface for receiving said wheel for said wheel to be rotated co-axially with said shaft, and where said mounting surface comprises coupling means for coupling said rotational drive from said base member to said wheel; and said hub further comprising a top member, where said top member comprises a bearing member for engaging said wheel to trap said wheel between said bearing member and said base member, and a clamping member for reversably engaging said base member to urge said bearing member towards said base member, said top member being removable from said base member when said clamping member is not in engagement with said base member to allow removal of said wheel, said clamping member comprising a handle for manual depression and rotation of said clamping member relative to said bearing member; said clamping member comprising a first catch and said bearing member comprising a first catch receiver for mutual engagement therebetween to retain said clamping member in association with said bearing member when said clamping member is not in engagement with said base member in a first or a second primary retention position having a first angular spacing therebetween, passage between said first and second primary retention positions being achieved by depression, rotation and release under elastic restitution of said clamping member relatively to said bearing member, said elastic restitution achieved by means of a spring between said clamping member and said bearing member; and said clamping member further comprising a second catch for insertion into said base member if and only if said clamping member is in said first primary retention position and if said top member is in a predetermined angular relationship to said base member, said base member comprising a second catch receiver operable to receive said second catch to urge said top member towards said base member subsequently to said insertion of said second catch into said base member, in response to said passage of said clamping member between said first and said second primary retention positions, and in consequence of said elastic restitution.

2. An assembly according to claim 1 wherein said second catch comprises a retention arm on said clamping member extending axially towards said base member and comprising a retaining lug proximate to the distal end thereof, wherein said base member comprises an internal ledge having a cutaway portion for admitting further passage of said retention arm into said base member when said top member is in said predetermined angular relationship with said base member and for allowing axial rotation of said retention arm relative to said base member during said passage between said first and said second primary retention positions; wherein said ledge comprises an upper surface for resisting insertion into said base member of said retention arm whenever, said retention arm not having been inserted further into said base member, said top member is not in said predetermined angular relationship to said base mamber; and wherein said ledge comprises a lower surface, said lower surface comprising a recess, provided as said second catch receiver, for urging thereinto of said retaining lug under said elastic restitution whenever said clamping means is released in said second primary retention position.

3. An assembly according to claim 2 wherein said first catch comprises an elastic arm on said clamping member axially extensive in the direction of said base member, and wherein said first catch further comprises a clip proximate to the distal end thereof, said first catch receiver comprising a cutaway pattern on a surface of said bearing member for receiving said clip during assembly of said clamping member and said bearing member by elastic displacement and replacement of said elastic arm, and said cutaway pattern further comprising an extension therein, separating said first and said second primary retention positions.

4. An assembly according to claim 3 wherein said extension in said cutaway pattern is extensive axially in the direction of said base member by a distance less than or equal to the distance required for said clamping member to be depressed relatively to said bearing member for said retaining lug to engage said lower surface of said ledge.

5. An assembly according to claim 4 wherein said recess in said lower surface of said ledge in said base member allows ingress thereinto under said elastic restitution of said retaining lug by a distance less than that required for said clip fully to engage said cutaway pattern when said clamping member is in said second primary retention position for said force of said elastic restitution to be applied entirely between said clamping member and said base member.

6. An assembly according to claim 5 wherein said first catch and said first catch receiver are co-operative to resist separation of said clamping member from said bearing member under the action of said spring.

7. An assembly according to claim 1 wherein said coupling means comprises an axially extensive keyway in said mounting surface for receiving a complementary key in said wheel as said wheel is assembled onto said base member.

8. An assembly according to claim 1 wherein said mounting surface is a surface of a first right circular cylindrical wall co-axial with said axis of the shaft, wherein said bearing member comprises a second right cylindrical wall for insertion co-axially into said first right circular cylindrical wall and wherein said clamping member comprises a third right circular cylindrical wall for insertion co-axially into said second right circular cylindrical wall.

9. An assembly according to claim 8 wherein said second right circular cylindrical wall is insertable behind said first right circular cylindrical wall as far as said ledge, said ledge resisting further insertion thereof when said lug engages said recess.

10. An assembly acording to claim 1 wherein said wheel comprises a void and wherein said base member comprises an insert, said void and said insert being co-operative to prevent assembly of said wheel onto said base member in any other than a predetermined orientation.

11. An assembly according to claim 1 wherein said wheel is a scrub wheel for use in a document transportation system.

12. An assembly according to claim 1 wherein said wheel is supportive of an item of apparatus or machinery operated in a rotary manner.

13. An assembly according to claim 1 wherein said bearing member comprises a collar for shrouding said handle when said assembly is assembled supportively of said wheel.

14. An apparatus comprising a wheel and a hub, said wheel being mountable upon said hub to receive rotational drive therefrom, said hub comprising:
base member means for receiving said wheel and coupling rotational drive to said wheel; and
top member means, engageable with said wheel and said base member means, for securing said wheel against said base member means;
wherein said top member means includes a bearing member; clamping member means for engaging said base member means to urge said bearing member towards said base member means, said top member means being removable from said base member means when said clamping member means is not in engagement with said base member means to allow removal of said wheel; and a spring between said clamping member means and said bearing member;
wherein said clamping member means includes a clamping member, said clamping member including a first catch, said first catch engageable with a first catch receiver included in said bearing member; said clamping member further including a second catch for insertion into said base member means, said second catch engageable with a second catch receiver included in said base member means; said clamping member means further including a handle coupled to said clamping member.

15. An assembly comprising a wheel and a demountable hub, said wheel being removably mountable upon said hub to receive rotational drive therefrom, said hub comprising:
a base member including a mounting surface for said wheel, said mounting surface including coupling means for coupling said rotational drive from said base member to said wheel;
a top member including a bearing member for engaging said wheel and a clamping member for engaging said base member, wherein said top member is removable from said base member when said clamping member is not in engagement with said base member;
a spring between said clamping member and said bearing member;
said clamping member including a first catch and said bearing member including a first catch receiver for mutual engagement therebetween; and
said clamping member further including a second catch and said base member including a second catch receiver for mutual engagement therebetween.

16. The assembly according to claim 15 wherein said clamping member further includes a handle.

17. The assembly according to claim 15 wherein:
said second catch includes a retention arm, a retaining lug provided at the distal end of said retention arm;
said base member includes an internal ledge having a cutaway portion for admitting passage of said retention arm into said base member.

18. The assembly according to claim 17 wherein said first catch includes an elastic arm, a clip provided at the distal end of said elastic arm.

19. The assembly according to claim 15 wherein said coupling means includes a keyway in said mounting surface, a complementary key provided in said wheel.

20. The assembly according to claim 15 wherein said wheel is a scrub wheel.

* * * * *